May 7, 1940.  A. M. ALEXANDRESCU  2,200,015
PISTON CONSTRUCTION
Filed May 7, 1937   2 Sheets-Sheet 1

Inventor
A. M. Alexandrescu
By Wilkinson & Mawhinney
Attorneys.

May 7, 1940.  A. M. ALEXANDRESCU  2,200,015
PISTON CONSTRUCTION
Filed May 7, 1937   2 Sheets-Sheet 2
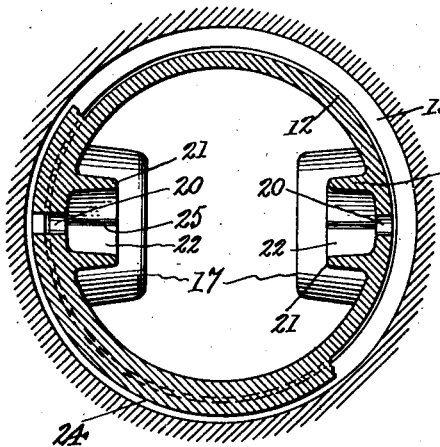
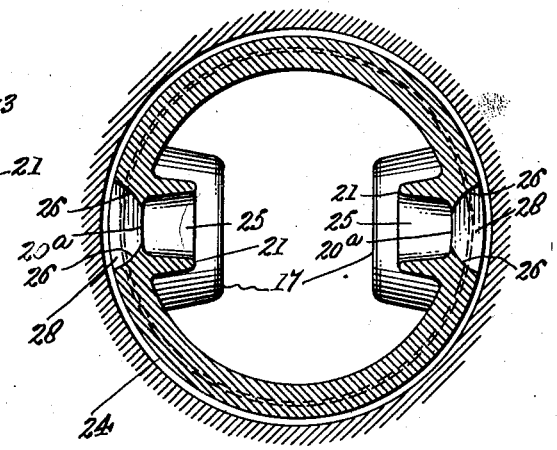
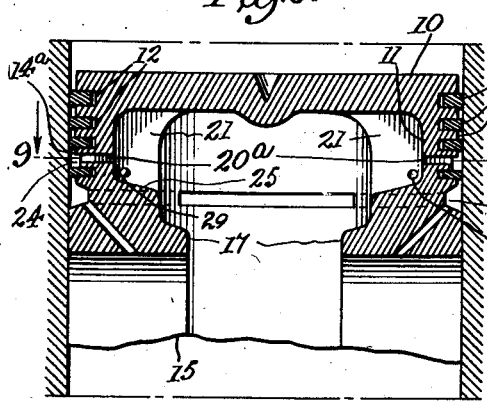
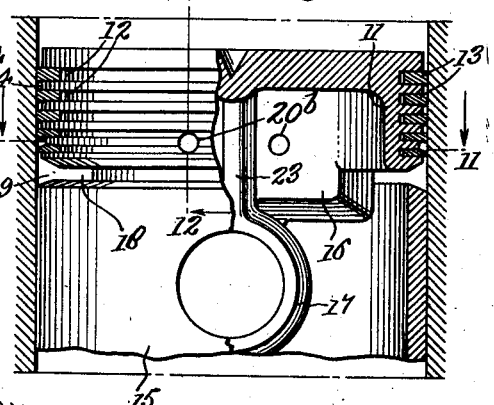
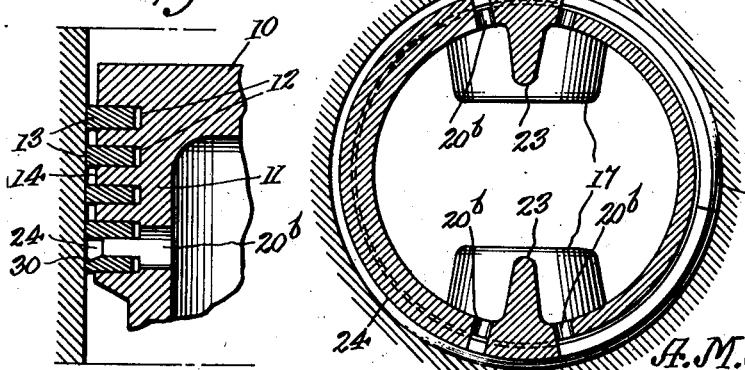
Inventor
A. M. Alexandrescu
By Wilkinson & Mawhinney
Attorneys.

Patented May 7, 1940

2,200,015

UNITED STATES PATENT OFFICE 2,200,015

PISTON CONSTRUCTION

Alexander M. Alexandrescu, Cleveland, Ohio

Application May 7, 1937, Serial No. 141,352

7 Claims. (Cl. 309—7)

This invention is a continuation in part of my copending application, Serial No. 77,036 filed April 29, 1936, for Piston and ring construction, and my Patent No. 2,110,316 granted March 8. 1938.

The present invention relates to improvements in piston constructions and has for an object to provide an improved piston and ring construction in which the rings are graduated or stepped in size from the largest width at the top of the piston to the minimum width for the innermost ring, the purpose being that the narrower rings will better hold the oil and prevent the other rings from being flooded.

This construction is particularly applicable in airplane engines where the cylinders are radially disposed; also in compressors. The pistons of the cylinders at the bottom contain a bath of oil with the piston running upside down. Thus the oil pressure is heavy on the innermost ring. So heavy is this oil pressure that it is apt to flood all of the rings and to flood also the combustion chamber. Consequently, it becomes necessary to secure great sealing power in the rings.

Another object of the invention is to provide for the carrying off of compression which has leaked through outer rings before the same is enabled to pass through inner rings or the innermost ring where it would be permitted to blow down against the outside wall of the skirt, blackening the skirt and blowing particles of soot and other products of combustion between the wall of the skirt and the cylinder wall. These accumulations of soot and foreign matter will cause cutting and scoring of the cylinder wall and skirt.

It is a further object of the invention to avoid accumulations of pressure getting beneath the innermost ring and driving out the mass of oil which resides below this ring. This mass of oil is intended to be delivered to the cylinder wall for the lubrication thereof and for the lubrication of the outer rings. It is therefore desirable that this residual supply of oil in the inner ring groove shall not be blown out by the leaking compression from above; and to this end I provide an exit in the piston to carry off such pressures before the same reach this innermost ring groove.

Another object of the invention is to so situate these exit openings as to protect same from the splash of oil from the crankcase.

With the foregoing and other objects in view, the invention will be more fully described hereinafter, and will be more particularly pointed out in the claims appended hereto.

In the drawings, wherein like symbols refer to like or corresponding parts throughout the several views.

Figure 6 is a horizontal section taken on the line 6—6 of Figure 5.

Figure 8 is a vertical section taken on the line 8—8 in Figure 7.

Figure 9 is a horizontal section taken on the line 9—9 of Figure 8.

Figure 10 is a view similar to Figure 1 showing a modification of exit opening.

Figure 11 is a horizontal section taken on the line 11—11 of Figure 10, and

Figure 12 is a fragmentary vertical section taken on the line 12—12 of Figure 10.

Figure 1:
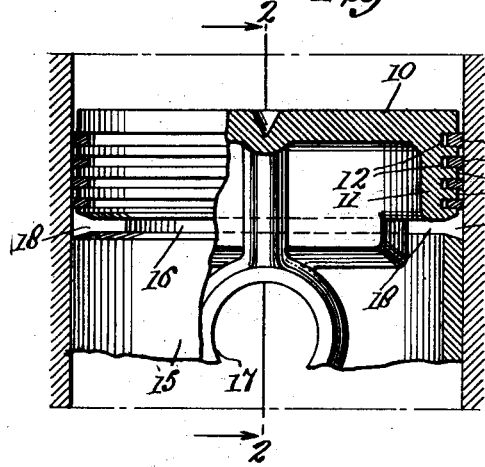
Figure 1 is a fragmentary vertical section taken through an engine cylinder showing the improved piston partly broken away and partly in elevation and section.
Figure 2:
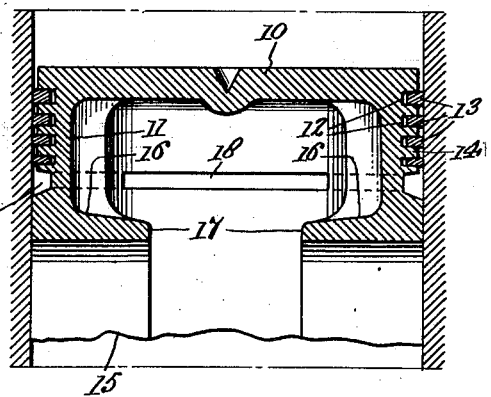
Figure 2 is a vertical section taken on the line 2—2 of Figure 1.
Figure 3:
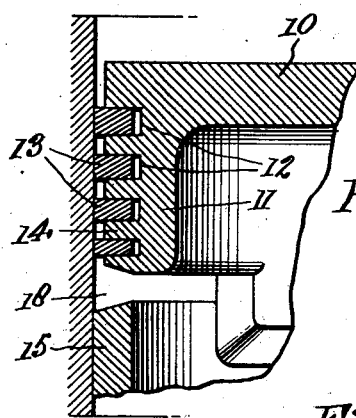
Figure 3 is an enlarged fragmentary vertical section of the ring column and adjacent part of the skirt.

Referring more particularly to the drawings, 10 designates the top of the piston and 11 the ring column. In this ring column are ring grooves 12 occupied by rings 13 and these rings are separated by the ring segments 14.

In accordance with the invention the top or outermost ring groove is made of a greater width than all of the others; the next groove is stepped down to a narrower width; and the remaining grooves are graduated down step by step until the lowermost or innermost ring groove becomes the smallest in width. The rings themselves are of corresponding widths, the ring greatest in width being that at the outermost part of the piston to receive directly the compression forces of the explosion. The innermost ring is the narrowest ring.

The skirt of the piston is shown at 15, and 16 indicates the connectors for connecting the skirt with the ring column 11. The bosses for the wrist pin are designated at 17.

The connectors 16 are separated at the sides of the piston to produce the lubricating openings 18. These openings are preferably disposed at substantially right angles to the axis of the wrist pin for the reason that the pressure of the cranks, connecting rods and wrist pin on the piston tends to create the greatest friction between the skirt and cylinder wall over areas of the skirt at substantially right angles to the wrist pin axis. The lubricating oil coming out the lubricating openings 18 may find its way completely around the piston through the annular channel 19.

One or more exit openings or holes 20 are provided through the ring column 11 and open out on the outside of the piston and the inside thereof. On the inside of the piston the mouth of the exit opening 20 is protected by the flanges 21. These flanges are cast with the top 10 and the ring column 11 so that they form an inclosure which is open only at its inner side. The lower parts 22 of the flanges are brought down diagonally in convergent relation and merge with a web 23 which joins with the boss 17. The same construction may be repeated at the other side of the piston if it is found necessary to provide an exit opening or slot at that point. These flanges and web also reinforce the piston interiorly and by their conductivity carry off heat. The important function of the flanges and the web, however, is to form a protection for the inner mouth of the exit opening 20 to guard the mouth against the oil which is being splashed up from the crankcase within the hollow piston. The inner mouth of the exit opening 20 is thus maintained free and unobstructed at all times.

Figure 5:
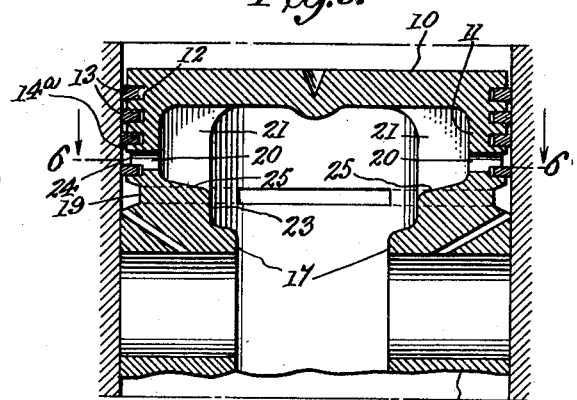
Figure 5 is a vertical section taken on the line 5—5 of Figure 4.

In Figure 5 the exit opening 20 is shown as communicating with the innermost or oil ring groove 12 and also with an undercut portion 24 of the ring column. This undercut portion forms an annular channel all around the piston. Such channel will receive any compression which has leaked through the outer rings and such compression may find its way through the exit opening 20 into the interior of the piston, and thence into the crankcase. Any excess of oil in the ring groove 12 for the lowermost narrowest ring 13 will discharge through the exit opening 20. This oil as it is delivered to the inside of the piston will drip down upon the diagonal parts 22 and be deflected thereby to the inclined crotch 25 which induces the oil to flow back into the crankcase. As shown in Figures 5 and 8 the undercut portion 24 is not cut through the top of the ring segment but a portion or flange 14ª is left to cut off the communication between the undercut portion 24 and the next highest ring groove. The wall 14ª also gives full support to the innermost compression ring.

Figure 7:
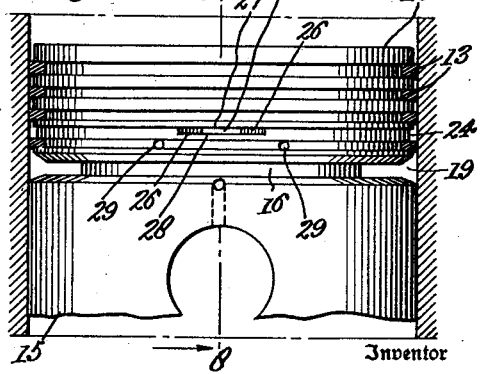
Figure 7 shows a section of a cylinder with a piston in elevation illustrating a slot form of exit opening.

In Figures 7, 8 and 9 the exit opening 20ª is in the form of a slot with divergent side walls 26 and top and bottom walls 27 and 28 made in the segment directly above the innermost or thinnest piston ring. This produces a fan-shaped opening which gives a circumferentially extensive mouth lying in the external cylindrical face of the undercut portion 24. Such wide mouth facilitates the carrying off of the pressures. The exit 20ª may or may not extend downwardly into the groove of the lowermost ring. Where the exit 20ª is wholly in the undercut portion 24, one or more holes or perforations 29 may be cut in the bottom portion of the groove 12 of the lowermost ring 13 to carry off excessive amounts of oil to the inside of the piston.

Figure 4:
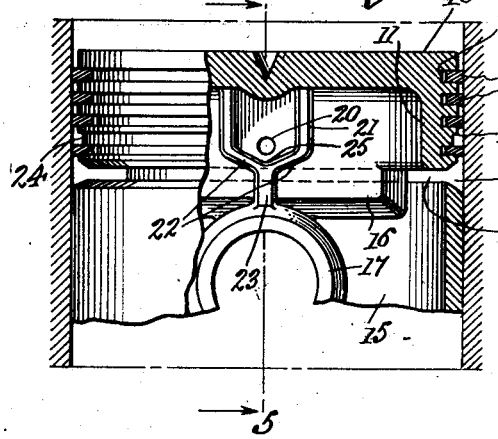
Figure 4 is a view similar to Figure 1 showing the exit opening.

The function of the contruction shown in Figs. 4, 5 and 6 and that shown in Figs. 7, 8 and 9 is similar to this extent, that the pressure from above, when the piston is being driven down on its power stroke is permitted to discharge from the undercut portion 24 to the hole 20 or slot 20ª. This allows for the rapid escape of any pressure leaking past the compression rings. The holes 20 and slots 29ª permit such leaking compression to be evacuated into the center of the piston, and thence downwardly into the crankcase. On the other hand when the piston is descending on its suction stroke, a partial vacuum is formed in the cylinder which tends to draw the air and the oil fumes upwardly from the crankcase through the holes 20 and the slots 20ª, into the undercut channel 24 and thus upwardly inasmuch as the rings permit of the upward movement of such air and oil fumes.

In Figures 10, 11 and 12, 20ᵇ indicates the exit openings, which exit openings are of larger diameter than the exit opening 20. Such exit openings 20ᵇ extend completely through the segment 14 above the innermost thinnest ring. The exit openings 20ᵇ also extend into the base portions of both inner ring grooves 12. The perforated segment 14 is completely undercut from top edge to bottom edge so that its outer surface lies inside the perimeter of the other segments. This forms an annular channel 24 all about the piston.

Figures 10, 11 and 12 show five ring grooves and five rings. In Diesel engines, which are smoky, the smoke may find its way out the exit opening 20ᵇ from the fourth ring groove. The smoke and pressure descending along the wall of the cylinder will get in behind the fourth ring and thus having ready exit through the opening 20ᵇ. The pressure that escapes past the outer edge of the fourth ring gets into the undercut annular channel 24 and is carried thereby to the exit opening 20ᵇ through which it escapes into the piston and into the crankcase. Excess oil in the bottom of the groove of the innermost piston ring will have direct exit out through the opening 20ᵇ as heretofore described. The lower two rings might be termed "oil rings." The grooves of these oil rings both communicate with the exit opening 20ᵇ as clearly seen in Figure 12. Also the annular channel 24 of the undercut portion which forms an oil chamber communicates with this exit opening 20ᵇ.

On the compression stroke the heavy smoke that gets past the first three rings may move behind the fourth ring getting into the groove behind the same and thence escaping through the exit opening 20ᵇ. Part of this smoke and pressure which passes the outside of the fourth ring and gets through into the annular channel 24 of the undercut portion may also find immediate exit through the opening 20ᵇ. The fifth ring thus positively excludes all smoke and compression from the skirt and forms a complete protection therefor, inasmuch as there is a more ready exit through the opening 20ᵇ than there is about the outer edge of the fifth ring. The double oil rings will also protect against the flood of oil that is pumped within the piston as is well known in this type of engine. Any excess of oil getting behind the fifth ring will find exit through the opening 20ᵇ. Any excess of oil passing the outer edge of the fifth ring and getting into the annular channel of the undercut portion or behind the fourth ring may also find ready exit through the exit opening 20ᵇ.

When the piston descends on the suction stroke vacuum pulls the first four rings up against the upper walls of their respective grooves. Thus the first oil ring along with the three compression rings serves to seal against the entrance of air from below. The suction will tend to draw air and fumes outwardly through the opening 20ᵇ. This air and fumes will get into the annular channel 24 of the undercut portion which will evenly distribute the same all around the piston.

It will be understood that the oil splashed or pumped up on the interior wall of the skirt 15 will find its way out of the lubricating openings 18 by reason of the rapid reciprocation of the piston and that this oil will get around in the annular channel 19 and be distributed over the surface of the skirt.

The top ring is made thickest as it must take the force of the firing and compression. The next ring is slightly smaller but it also tends to hold the compression.

The lowermost ring is made narrow in order that it may have a minimum of bearing on the wall of the cylinder and thus be more effective irrespective of whether this ring is rocked or canted. With the normal oil ring, such ring becomes tilted; particularly when the engine is cold it will rock up on one of its sharp corner portions, thus moving the outer surface of the ring away from the surface of the cylinder, and allowing the compression to blow by the ring, or the air from below to upwardly pass the ring and destroy the vacuum of the suction stroke. The smaller the outer surface of the oil ring, the less it is effected by the rocking or tilting common to the normal oil ring with respect to the cylinder wall. Therefore, the rings are preferably graduated with the lowermost ring being of smallest height or thickness. The lowermost ring is preferably tapered as indicated at 30 in order to further diminish the peripheral surface area of the ring in actual contact with the cylinder wall.

The flanges 23 extend from the top of the piston down the ring column and merge in the bosses 17 giving strength to the structure, tending to carry off heat and also acting in a measure to protect the perforations 20b from the splashing of the oil.

It is obvious that various changes and modifications may be made in the details of construction and design of the above specifically described embodiments of this invention without departing from the spirit thereof, such changes and modifications being restricted only by the scope of the following claims.

What is claimed is:

1. In a piston for internal combustion engines, a head, a ring column having grooves therein, rings in said grooves, said ring column also having an undercut portion forming a channel about the piston offset inwardly from the outer perimeter of the ring column, said piston having exit means for said channel extending completely through the wall of the piston and communicating on its external face with the outer surface of said undercut annular portion and a pair of inwardly extending flanges carried by said ring column at diametrically opposed points, said exit being disposed between a pair of flanges.

2. In a piston for internal combustion engines, a head, a ring column having grooves therein, rings in said grooves, said ring column also having an undercut portion forming a channel about the piston offset inwardly from the outer perimeter of the ring column, said piston having exit means for said channel extending completely through the wall of the piston and communicating on its external face with the outer surface of said undercut annular portion, and also communicating with the bottom wall of the oil groove and a pair of inwardly extending flanges carried by said ring column at diametrically opposed points, said exit being disposed between a pair of flanges.

3. In a piston for internal combustion engines, a head, a ring column having grooves therein, rings in said grooves, said ring column also having an undercut portion forming a channel about the piston offset inwardly from the outer perimeter of the ring column, said undercut portion communicating at one side with the oil ring groove, said piston having a segment portion cutting off the undercut portion from communication with the next outer ring groove, said piston having exit means for said channel extending completely through the wall of the piston and communicating on its external face with the outer surface of said undercut annular portion, said exit opening being elongated circumferentially in the form of a slot with flaring side walls, and an elongated mouth coinciding with the outer surface part of the undercut portion.

4. In a piston for internal combustion engines, a head, a ring column having grooves therein, rings in said grooves, said ring column also having an undercut portion forming a channel about the piston offset inwardly from the outer perimeter of the ring column, said undercut portion communicating at one side with the oil ring groove, said piston having a segment portion cutting off the undercut portion from communication with the next outer ring groove, said piston having exit means for said channel extending completely through the wall of the piston and communicating on its external face with the outer surface of said undercut annular portion, said exit opening being elongated circumferentially in the form of a slot with flaring side walls, an elongated mouth coinciding with the outer surface part of the undercut portion, said slotted exit opening being only in the segment separating the oil ring groove from the next adjacent upper groove, said segment having a flange at its outer portion and at the outer portion of the mouth of the slot, the outer part of the flange being in line with the outer portions of the other segments, said piston having one or more openings therethrough leading from the base of the oil groove into the interior of the piston.

5. In a piston for internal combustion engines having a side wall with an opening therethrough, a wrist pin and a boss for flanges attached to the upper part and side wall of said piston and having convergent lower portions forming a central trough, and a web extending from the trough down to the boss of the piston.

6. A piston comprising a head, ring column and a skirt, said ring column having grooves therein, rings in said grooves, said ring column having an undercut portion extending around the column and on the outside of the column, said ring column having an exit opening communicating with said undercut portion and extending through to the interior of the piston, said skirt having bosses, said ring column having a lubricating opening at substantially right angles to the axes of the bosses to receive the lubricant splashed up from the crankcase, said exit opening placed near one of the bosses with the boss in the path of the splashed lubricant to said exit opening.

7. In a piston for internal combustion engines having a side wall with an opening therethrough, flanges attached to the side wall of said piston, one of said flanges being at one side of the opening and another at the opposite side of the opening, the lower portions of said flanges converging down to form a crotch below the opening.

ALEXANDER M. ALEXANDRESCU.